United States Patent [19]

Hara

[11] Patent Number: 5,460,452
[45] Date of Patent: Oct. 24, 1995

[54] LINEAR MOTION ROLLING GUIDE UNIT

[75] Inventor: Takehiko Hara, Kanagawa, Japan

[73] Assignee: Nitto Thompson Co., Ltd., Tokyo, Japan

[21] Appl. No.: 200,520

[22] Filed: Feb. 23, 1994

[30] Foreign Application Priority Data

Feb. 25, 1993 [JP] Japan ................... 5-012664

[51] Int. Cl.⁶ .................................................. F16C 29/06
[52] U.S. Cl. .................................................. 384/45
[58] Field of Search ................... 384/45, 43, 44; 464/168

[56] References Cited

U.S. PATENT DOCUMENTS 5,011,300  4/1991  Teramachi ................... 384/45
5,059,037  10/1991 Albert ......................... 384/45
5,297,873  3/1994  Komiya ........................ 384/45

Primary Examiner—Lenard A. Footland
Attorney, Agent, or Firm—Sughrue, Mion, Zinn, Macpeak & Seas

[57] ABSTRACT

A linear motion rolling guide unit is described that together with allowing fixing of the moving side in an apparatus and so forth on which it is to be equipped to be achieved easily when attempting to do so, also contributes to simplification of the structure of said apparatus and so forth.

The above-mentioned effects are obtained by equipping said linear motion rolling guide with a regulating device that regulates the relative motion of a track rail and casing by causing mutual contact between said track rail and said casing.

5 Claims, 6 Drawing Sheets

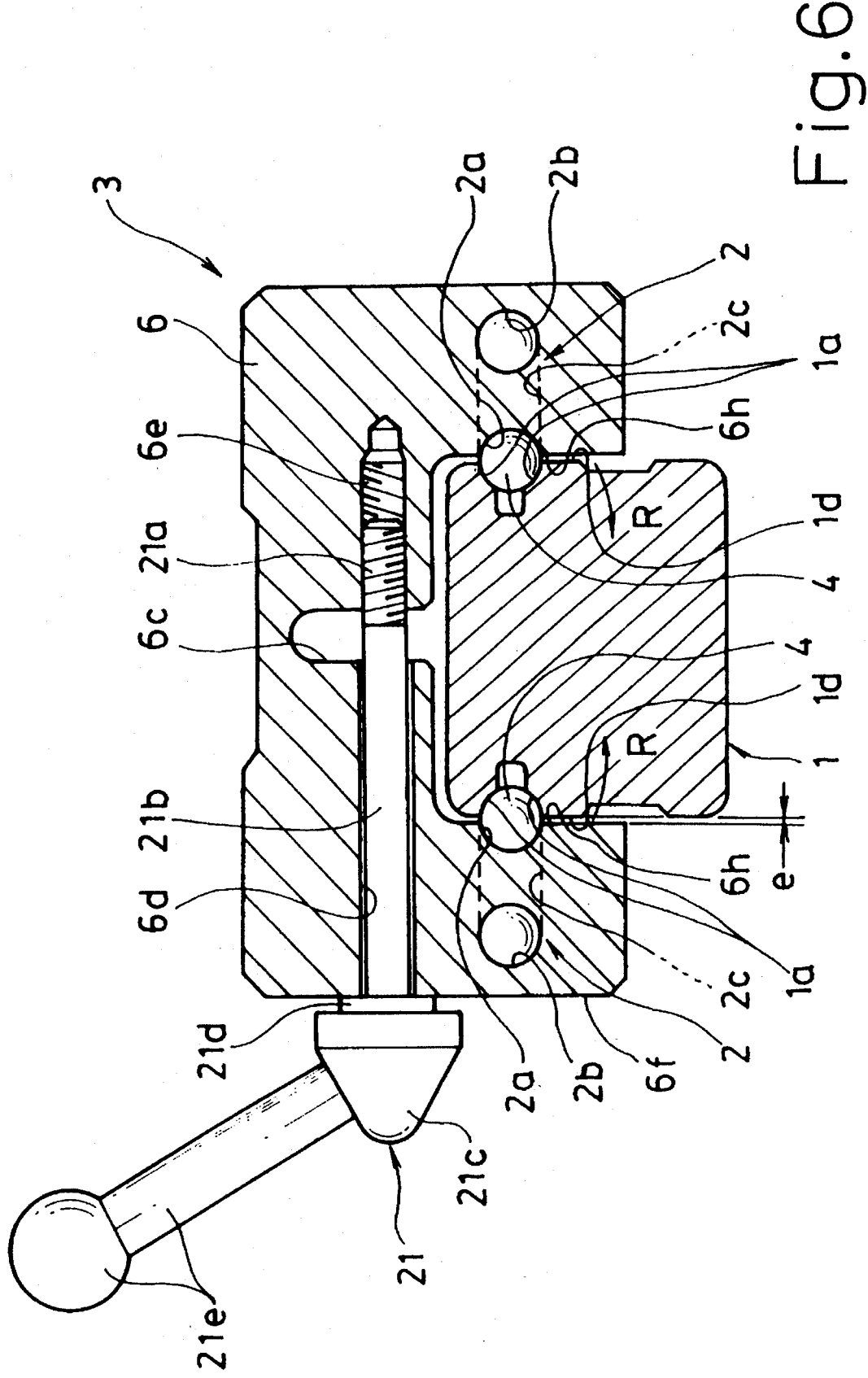

LINEAR MOTION ROLLING GUIDE UNIT

BACKGROUND OF THE INVENTION

1. Field of the Invention

The present invention relates to a linear motion rolling guide unit that linearly guides a movable object to be moved, and which is equipped on, for example, a machine tool or industrial robot.

2. Description of the Prior Art

A typical example of this type of linear motion rolling guide unit of the prior art is shown in FIGS. 1 and 2.

As shown in the drawings, said linear motion rolling guide unit has track rail 1, in which tracks in the form of track grooves 1a are formed in the right and left sides along the lengthwise direction, a slider in the form of sliding unit 3 able to move relative to track rail 1 and having rolling element circulating path 2 (the details of which will be described later), and a plurality of rolling elements in the form of balls 4 arranged and contained in said rolling element circulating path 2 which bear the load between track rail 1 and sliding unit 3 by circulating while rolling over said track grooves 1a accompanying movement of said sliding unit 3.

Sliding unit 3 has casing 6, provided so as to straddle track rail 1, a pair of end caps 7a and 7b coupled to the front and back ends of said casing 6, and two seals 8a and 8b attached to each of the outer surfaces of said end caps 7a and 6b. Furthermore, grease nipple 9 for supplying grease to the above-mentioned balls 4 is attached to end cap 7a. As shown in FIG. 2, rolling element circulating path 2 is composed of load bearing track groove 2a and return path 2b formed linearly and in parallel with each other in casing 6, and a pair of roughly semi-circular direction changing paths 2c and 2d formed in both end caps 7a and 7b that connect said load bearing track groove 2a and return path 2b at their ends. Furthermore, the above-mentioned load bearing track groove 2a corresponds to track groove 1a of track rail 1. In addition, in FIG. 1, reference numeral 11 indicates a retaining member that retains balls 4 so that they do not fall out of the above-mentioned load bearing track groove 2a.

A linear motion rolling guide unit having the above-mentioned constitution is arranged on, for example, the bed of a machine tool (not shown), and track rail 1 is fastened to said bed with bolts. A table for holding a workpiece and so on (not shown) is bolted to sliding unit 3, with this operating as the moving side. Namely, said table is reciprocated by a driving device not shown with a workpiece and so forth placed on said table. Furthermore, as shown in FIG. 1, a plurality of bolt insertion holes 1b for fastening to the above-mentioned bed and so on are formed in track rail 1. In addition, a plurality of threaded holes 6a are formed in the upper surface of casing 6 of sliding unit 3. The above-mentioned table is fastened to sliding unit 3 by bolts (not shown) that are screwed into these threaded holes 6a.

In the above-mentioned constitution, a clamping mechanism and so forth is provided for fastening said table to a stationary side in the form of a bed in order to completely stop the above-mentioned table at a certain position. However, depending on the apparatus on which a linear motion rolling guide unit is to be equipped, there are cases in which it is difficult to provide a clamping mechanism and so forth due to factors relating to structure, installation space and so on. In addition, even if such a clamping mechanism is provided, there is the additional disadvantage of forcing changes to be made in the designs of other mechanical components.

SUMMARY OF THE INVENTION

In consideration of the above-mentioned disadvantages of the prior art, the object of the present invention is to provide a linear motion guide unit that allows fixing of the moving side in an apparatus and so forth to be equipped to be easily achieved in the case it is desired to do so, while also contributing to simplification of the structure of said apparatus and so forth.

The present invention composes a linear motion rolling guide unit equipped with a track rail in which tracks are formed along the lengthwise direction, a casing able to move relative to said track rail and wherein load bearing tracks corresponding to said tracks and return paths parallel to said load bearing tracks are formed, end caps coupled to both ends of said casing wherein direction changing paths are formed that form a rolling element circulating path with said load bearing tracks and return paths, and a plurality of rolling elements arranged and contained in said rolling element circulating path that bear the load by circulating while rolling over said tracks; and having a regulating device that regulates relative movement by causing mutual contact between said track rail and said casing.

BRIEF DESCRIPTION OF THE DRAWINGS

FIG. 6 is a vertical cross-sectional view of the constitution shown in FIG. 3.

DESCRIPTION OF THE PREFERRED EMBODIMENTS

Figure 1:
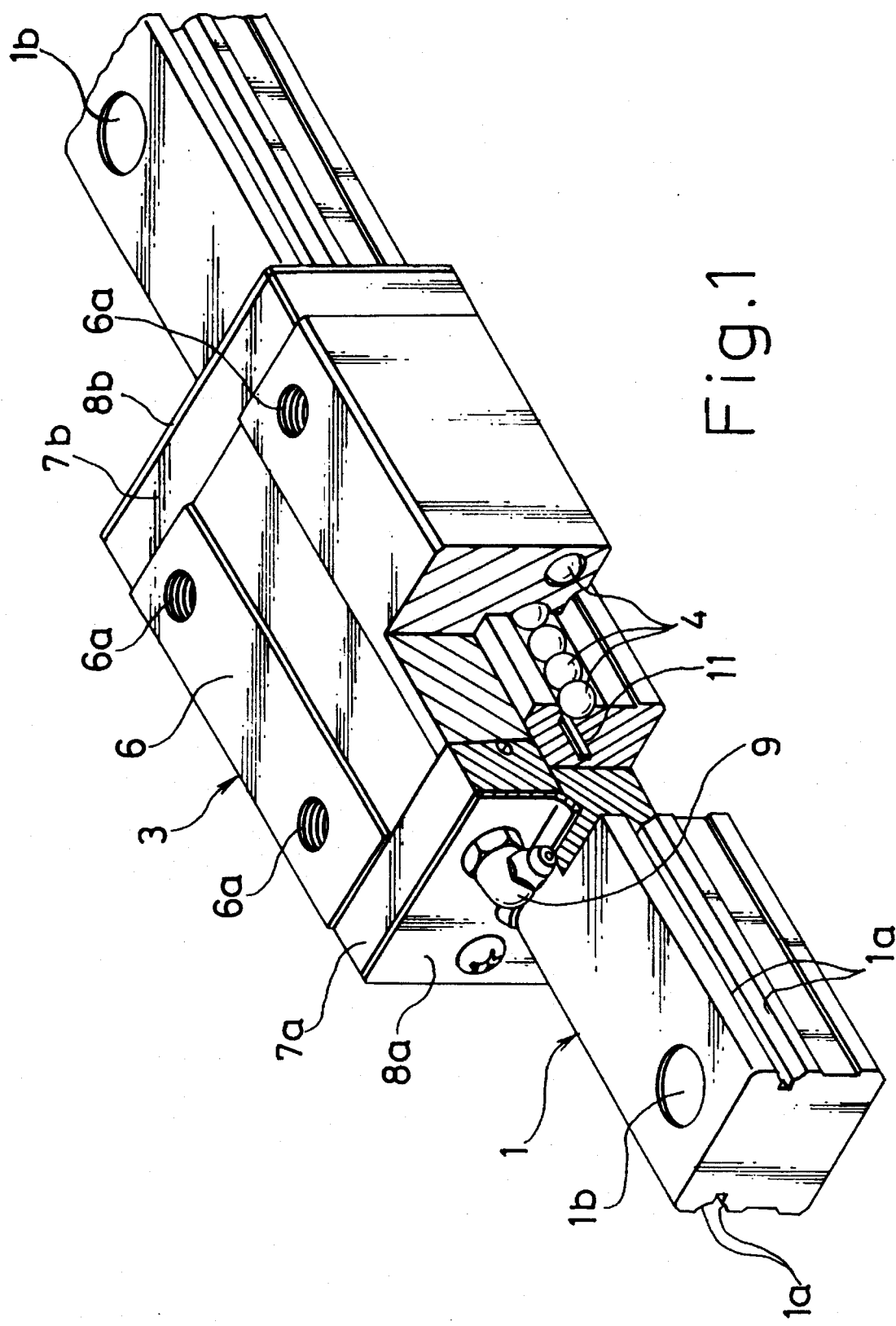
FIG. 1 is a perspective view, including a partial cross-section, of the essential portion of a linear motion rolling guide unit of the prior art.
Figure 2:
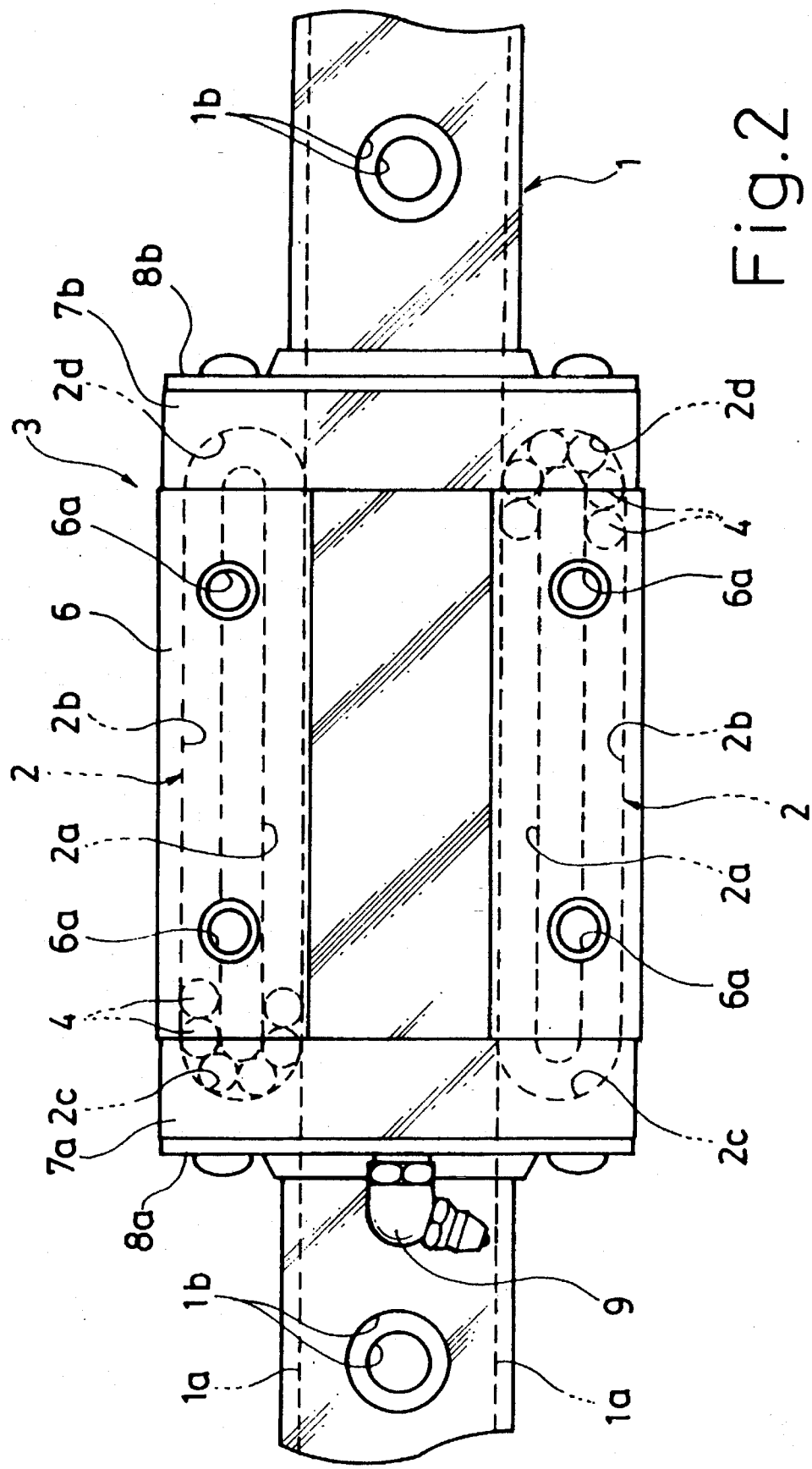
FIG. 2 is a top view of the constitution shown in FIG. 1.
Figure 3:
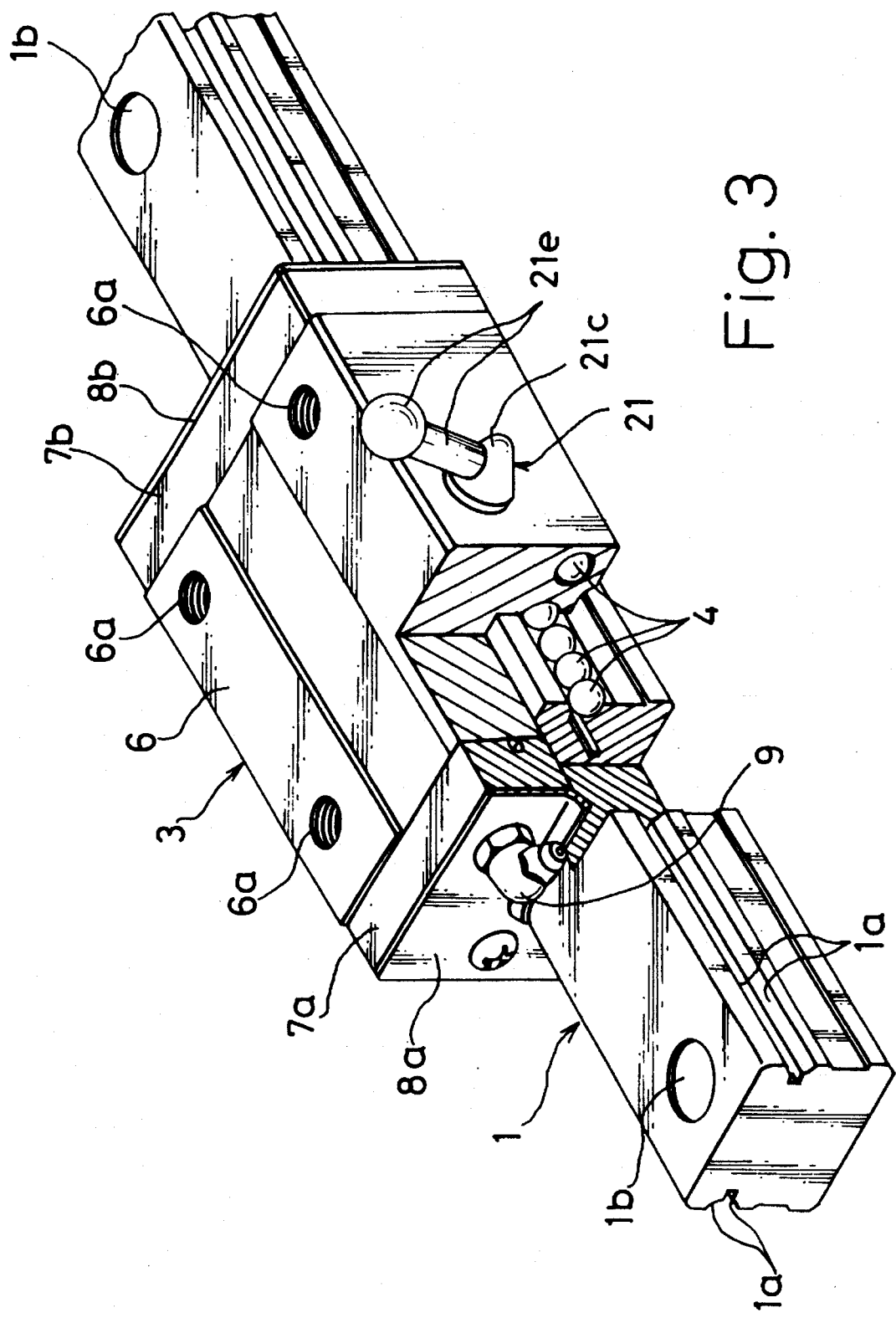
FIG. 3 is a perspective view, including a partial cross-section, of the essential portion of an embodiment of the linear motion rolling guide unit of the present invention.
Figure 4:
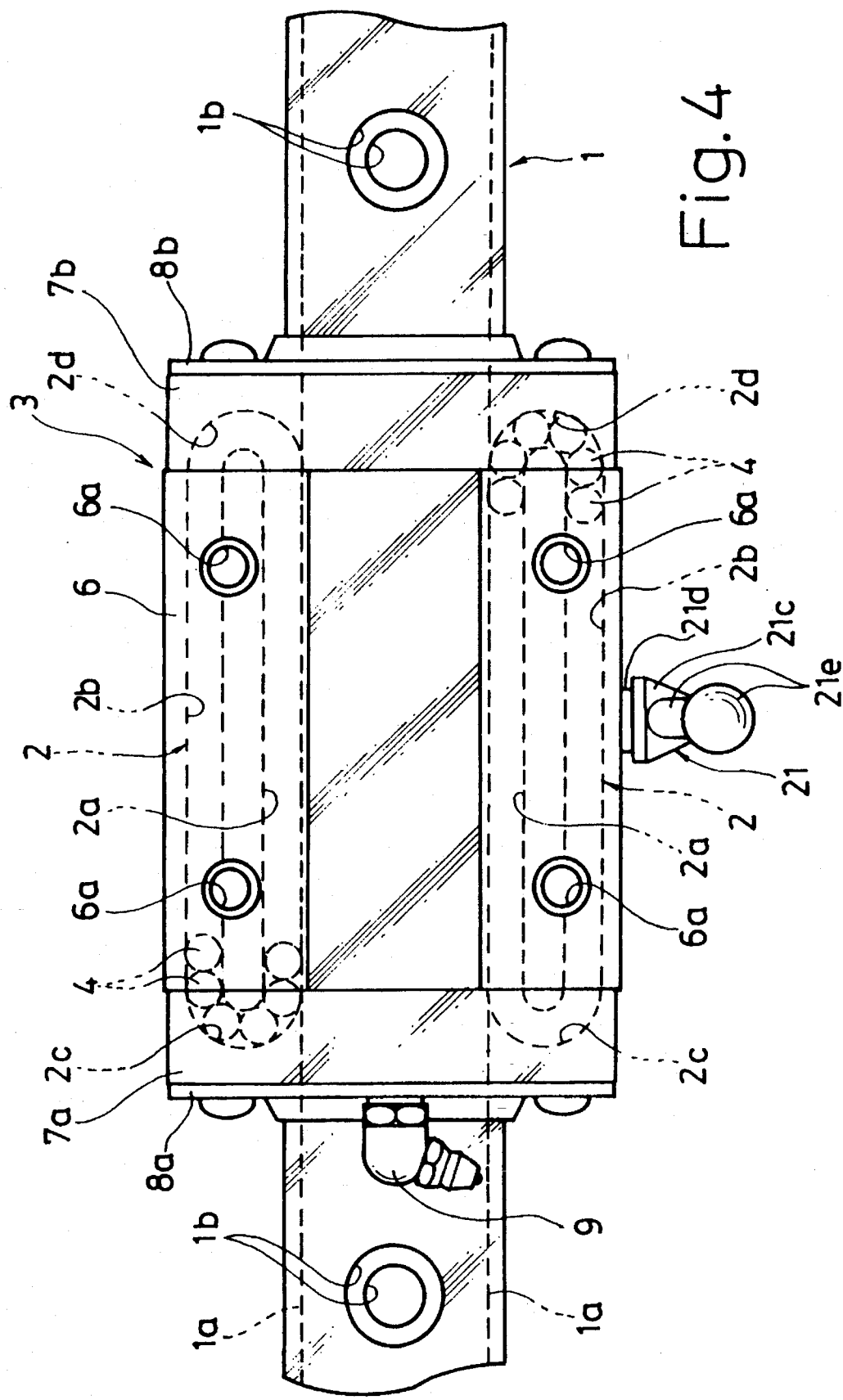
FIG. 4 is a top view of the constitution shown in FIG. 3.
Figure 5:
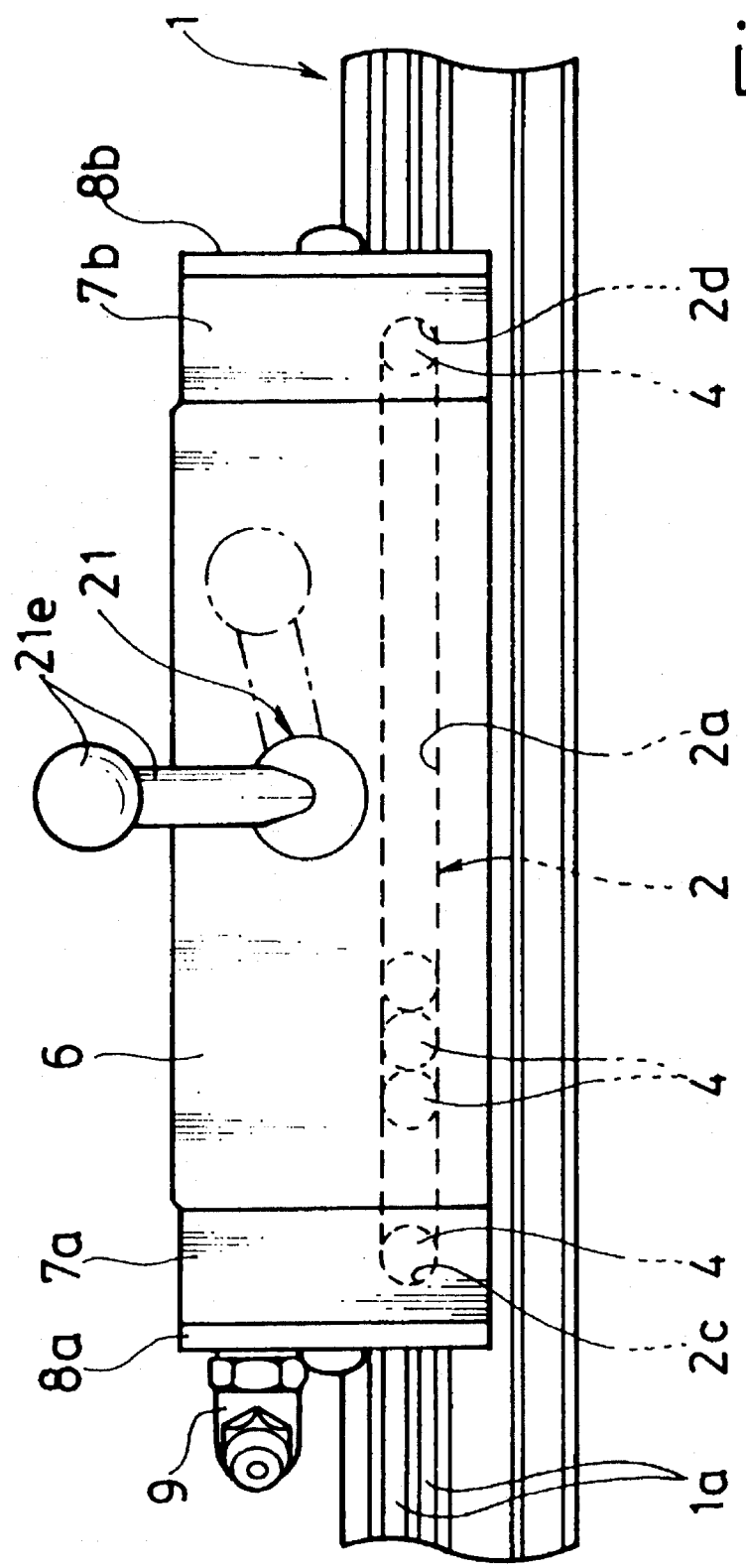
FIG. 5 is a side view of the constitution shown in FIG. 3.

The following provides an explanation of an embodiment of the linear motion rolling guide unit of the present invention with reference to the attached drawings. Furthermore, since said linear motion rolling guide unit is composed similar to the linear motion rolling guide unit of the prior art shown in FIGS. 1 and 2 with the exception of those portions explained below, the explanation will only focus on the essential portion with an overall explanation of the unit omitted. In addition, in the following explanation, the same reference numerals will be used for those constituent members which are identical to the constituent members of said linear motion rolling guide unit of the prior art.

In the linear motion rolling guide unit as claimed in the present invention, a regulating device is provided for regulating the movement of casing 6 with respect to the track rail 1. Said regulating device is composed in the manner described below. Furthermore, this regulating device regulates movement by causing contact between casing 6 and track rail 1.

As shown in FIGS. 3 through 6, said regulating device is arranged at a location away from the apex of track rail 1, and is composed of long regulating member 21 extending in the direction transverse to casing 6. Furthermore, although the configuration of regulating member 21 can naturally be suitably changed according to the situation, by arranging said regulating member 21 in this manner, it is difficult for said regulating member 21 to interfere with the mechanical portions of the apparatus, while also allowing it to be easily operated from the side.

As is clear from FIG. 6, this regulating member 21 has rod 21b in which threaded portion 21a is formed in one end, and roughly conical head 21c formed integrated into a single structure with said rod 21b on the other end of said rod 21b.

On the other hand, slit 6c is formed in the center of casing 6 in the direction of width so as to extend in the direction of motion of said sliding unit 3. The above-mentioned rod 21b is inserted into insertion hole 6d formed in one of the sections resulting from being divided by this slit 6c, while threaded portion 21a is screwed into threaded hole 6e formed in the other section.

Contact portion 21d is formed in the above-mentioned regulating member 21, which regulates the movement of said regulating member 21 in the direction in which threaded portion 21a is screwed in by making contact with side surface 6f of casing 6 in the vicinity of head 21c.

Slit 6c formed in casing 6 is to allow said casing 6 to be able to be deflected in the direction of movement of the above-mentioned threaded portion 21a. In said constitution, casing 6 deflects as shown with arrows R (refer to FIG. 6) as a result of the tightening of rotating regulating member 21. Inner side surface 6h of casing 6 makes contact with side surface 1d of track rail 1 resulting in braking action that regulates the movement of sliding unit 3. In addition, if regulating member 21 is conversely rotated to loosen, casing 6 is restored by its resiliency resulting in release of the regulated state. Furthermore, in this case, gap e between side surface 1d of track rail 1 and inner side surface 6h of casing 6 (refer to FIG. 6) is set so that both make contact when the sum of the amount of permanent deformation of the contact portion of balls 4 and track grooves 1a exceeds 1/10,000 of the diameter of balls 4.

However, handle 21e is provided on head 21c of the above-mentioned regulating member 21 to rotate said regulating member 21. Accordingly, a worker is able to perform regulation and release of said regulation by operating this handle 21e by hand without having to use a special tool and so forth. However, a constitution may also be employed wherein head 21c is formed into the shape of an ordinary hexagonal column or hexagonal socket without providing this handle 21e, and regulating member 21 is then rotated using a corresponding tool and so forth.

Furthermore, although braking force is able to be obtained in the present embodiment by causing contact between a track rail and a casing as a result of deflecting said casing 6 by using a regulating device that regulates the relative movement of a track rail and a casing, using regulating member 21 having threaded portion 21a, and tightening said regulating member 21, regulating devices having various other types of constitutions can naturally also be employed as long as the produce this type of braking force.

In addition, although balls 4 are used for the rolling elements in the present embodiment, a constitution may also be employed in which rollers are used. In addition, although rows of balls are each provided on the right and left sides in the present embodiment, a constitution may also be employed in which two or more such rows are provided on each side.

Moreover, the present invention can also be applied to other embodiments in addition to the present embodiment in the case track rail 1 has curvature on a straight line and said embodiment performs curved movement.

As explained above, in the linear motion rolling guide unit according to the present invention, since braking force is produced by a regulating device equipped on said linear motion rolling guide unit causing contact between a track rail and a casing, fixing of the moving side in an apparatus and so forth on which said linear motion rolling guide unit is to be equipped can be achieved easily when it is necessary to do so, thus offering a first advantage of the present invention. In addition, since alteration of the design of said apparatus and so forth is not required, the present invention offers a second advantage in terms of contributing to simplification of the structure of said apparatus and so forth.

What is claimed is:

1. A linear motion rolling guide unit comprising:

a track rail having tracks formed along the lengthwise direction, a casing able to move relative to said track rail and having load bearing tracks corresponding to said tracks and return paths substantially parallel to said load bearing tracks, end caps coupled to both ends of said casing having direction changing paths that form a rolling element circulating path with said load bearing tracks and return paths, a plurality of rolling elements arranged and contained in said rolling element circulating path that bear the load by circulating while rolling over said tracks, and a regulating device that regulates relative-movement by causing mutual contact between said track rail and said casing, said regulating device is arranged to extend in a direction transverse to said casing at a location away from the apex of said track rail.

2. The linear motion rolling guide unit as set forth in claim 1 wherein said regulating device has a threaded portion that is screwed into said casing, and is composed of a regulating member wherein a contact portion is formed that regulates the movement of said regulating member in the direction in which said threaded portion is screwed in by making contact with said casing.

3. The linear motion rolling guide unit as set forth in claim 2 wherein a slit is formed in said casing that allows deflection of said casing in the direction of movement of said threaded portion.

4. The linear motion rolling guide unit as set forth in claim 2 wherein said regulating member is provided with a handle for rotating said regulating member.

5. A linear motion rolling guide unit comprising:

a track rail having tracks formed along the lengthwise direction;

a casing able to move relative to said track rail and having load bearing tracks corresponding to said tracks and return paths substantially parallel to said load bearing tracks;

end caps coupled to both ends of said casing having direction changing paths that form a rolling element circulating path with said load bearing tracks and return paths;

a plurality of rolling elements arranged and contained in said rolling element circulating path that bear the load by circulating while rolling over said tracks; and a regulating device that regulates relative movement by causing mutual contact between said track rail and said casing when a total amount of permanent deformation of a point of contact of said rolling elements and said track surface exceeds approximately 1/10,000 the diameter of said rolling elements.

* * * * *

UNITED STATES PATENT AND TRADEMARK OFFICE
CERTIFICATE OF CORRECTION

PATENT NO.   : 5,460,452
DATED        : October 24, 1995
INVENTOR(S)  : Takehiko HARA It is certified that error(s) appears in the above-identified patent and that said Letters Patent is hereby corrected as shown below:

On title page, item [73], change "Nitto Thompson Co., Ltd." to --Nippon Thompson Signed and Sealed this Twenty-fourth Day of June, 1997

Attest:

BRUCE LEHMAN

*Attesting Officer*   *Commissioner of Patents and Trademarks*